May 27, 1958  M. L. JOHNSON  2,836,695
DEVICE FOR INTEGRATING HEAT-ABSORBING CAPACITY
Filed Jan. 11, 1955
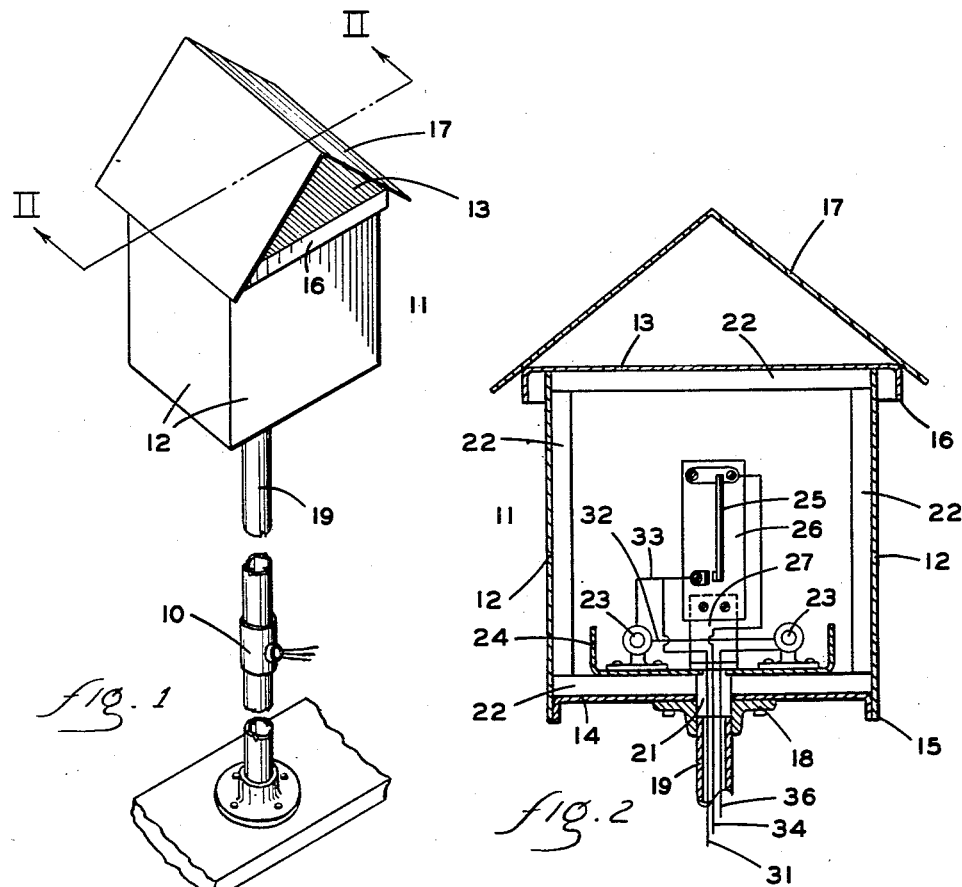
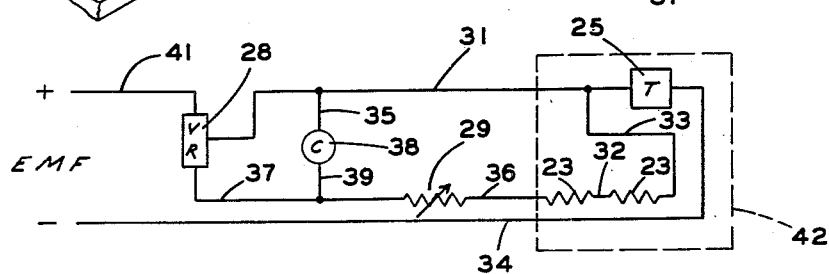
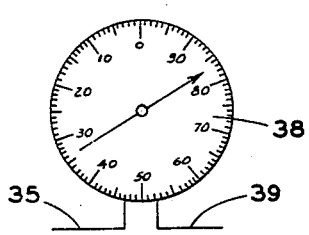
INVENTOR.
MENSAL LEE JOHNSON
BY

United States Patent Office

2,836,695
Patented May 27, 1958

2,836,695

DEVICE FOR INTEGRATING HEAT-ABSORBING CAPACITY

Mensal Lee Johnson, Kalamazoo, Mich.; Margaret O. Lamb, executrix of said Mensal Lee Johnson, deceased, assignor to herself, individually Application January 11, 1955, Serial No. 481,137

6 Claims. (Cl. 219—20)

This invention relates to a method and a device for integrating the heat-absorbing capacity of an environment, particularly the heat-absorbing capacity of an environment subject to irregular fluctuations of its properties influencing its heat absorbing capacity from a surface.

The exchange of heat between a surface and an environment in contact with the surface enters into manufacturing and other processes of daily effort and living probably more than any other operation. Heating or cooling is a necessary step in a great majority of manufacturing operations, as well as in the operation of practically all building structures. The calculation of heating or cooling requirements to effect any given exchange of heat between a surface and an environment in contact with it is based on well known principles which need not be gone into here. It is a fact, however, that most such calculations involve the assumption of a steady state as between the surface and its environment. The accurate calculation of heating or cooling required to produce a given effect when either the surface or the environment is subject to wide and irregular fluctuations in its properties which affect its heat transfer characteristics becomes very involved and, in most cases, impossible to carry out with any great degree of accuracy. It is known, for example, that when air is utilized as a medium for cooling a surface its effectiveness is influenced greatly by its original temperature, by the speed with which it is moved across the surface, by its moisture content and by other factors. The effect of radiation from a source within the environment falling upon the surface cannot be neglected. The difficulty is all the more apparent when it is realized that all of these factors, and others, vary in the case of air not only from season to season and from day to day but also from hour to hour as well. As a result, cooling systems which depend upon the use of air or, for that matter, upon the use of any other fluid which is subject to wide variations in its properties, are generally designed to accomplish the desired effect under the most adverse conditions. It is apparent that when designed and operated in this manner, the operation becomes highly uneconomic when other than the most adverse conditions prevail. This results in the waste of considerable power, undue wear and tear on equipment and the like.

The same factors are encountered in the heating of a building, which can be considered merely as a case of cooling a heated building with atmospheric air. Since there is no possibility of regulating the variable factors of the atmosphere which influence its absorption of heat from a building surface, the problem is generally solved by regulating thermostatically the amount of heat which is generated inside the building so that its generation just balances the heat lost through the wall of the building to the atmospheric environment. The temperature inside the building can thus be maintained practically constant.

Even in the case of the heating of buildings, however, and even with thermostatic control of the heat generated within the building, the fluctuation in the properties of the environment surrounding the building must be taken into account in certain ways. Thus, the amount of fuel which is required is related directly to the flow of heat from the building into the surrounding atmospheric environment. In periods of unusually severe weather, either by reason of low outdoor temperatures or high winds, or both, more fuel is required and the person or firm responsible for keeping the fuel supply on hand adequate for all purposes must take this into account. In large buildings, where the normal supply of fuel on hand is relatively small with respect to the rate of consumption because of limited storage capacity, the changing weather conditions become critical factors to be taken into account even though little or nothing can be done about decreasing the total amount of fuel actually required.

Many residential buildings are heated by the burning of fuel oil which is furnished by a supply company to the home owner on a "Keep Filled" basis. This means that the supplier of the oil assumes the responsibility of refilling the customer's supply tank before it is completely empty, thus assuring the customer of uninterrupted heat. This poses quite a serious problem to the fuel oil supplier who, for most economical service, must delay refilling the customer's supply tank until it becomes almost empty, but who must at the same time be sure to avoid letting the tank become completely empty. Most fuel oil dealers attempt to calculate from available weather reports and from the date on which they last filled a given customer's supply tank, just when they should deliver additional oil to his tank.

It is possible to determine with a surprising degree of accuracy the amount of fuel which will be burned in a particular residence or other building under substantially constant atmospheric conditions. It is obvious, however, that to do this for normal variable weather conditions and under existing methods of weather instrumentation and reporting would require a great deal of difficult and time-consuming calculation, which the fuel dealer has neither the time nor the inclination to do. Furthermore, continuous data on many atmospheric conditions which influence the final result of such a calculation are not available.

As a result, the general practice, especially with fuel oil suppliers, is to attempt to refill a customer's tank when not more than about 60 to 65% of the oil has been used out of the full tank. It is apparent that if deliveries could be delayed until even 71 or 72% of the oil has been used out of the tank, rather than 65%, the supplier would save one delivery trip in ten and that his over-all delivery cost, and thus the cost to the consumer, could be reduced accordingly. If the number of deliveries to a customer per season could be reduced still further, a correspondingly greater saving could be effected without danger. Under present conditions, however, it is not generally considered safe to attempt to cut delivery schedules to less than about the extent indicated for fear that some customers will run completely out of oil and suffer inconvenience and damage due to being without heat.

Many attempts have been made to overcome the situations mentioned previously, particularly in the case of cooling by atmospheric air. However, none of them have met with any particular success because they have either been inherently inaccurate and thus of little value or because they have required constant or frequent attention which cannot be left to unskilled help, or for other reasons.

In particular it has been proposed to integrate the heat requirements of a building by constructing a box having a heat loss per square foot similar to an average residence and mounting the box where it is exposed to the weather. The box is heated by a thermostatically controlled electric unit which maintains the box at a uniform temperature, usually 65° F., and current supplied is measured with a watt-hour meter which, for convenience, is calibrated in degree-day units, each unit representing the electrical energy required to maintain the temperature inside the box constant for an entire day with a one degree constant temperature differential between the inside and the outside of the box. However, no suitable arrangement of this type has been developed for this purpose heretofore either because of the physical limitations of available watt-hour meters or because of the difficulty when using such an arrangement of overcoming the effect of all of the variables which affect the heat-absorbing capacity of the environment. In addition, because of the effect of line resistances, such an arrangement is liable to be highly inaccurate if the meter is located at too great a distance from the box. As a consequence, this and other similar devices have not been used to any extent and the problem has remained unsolved up to the present time.

It is apparent that any device or method which could be operated substantially automatically and which could be relied upon with confidence to integrate over a period of time the heat-absorbing capacity of an environment from a surface, e. g. of the atmosphere from the surface of a building, and which would take into account adequately the fluctuations in temperature, humidity and movement of the environmental medium, as well as other factors such as radiation which affect the heat-absorbing capacity of the environment, would be of great value.

It is, therefore, an object of the present invention to provide a device for integrating over a period of time the heat-absorbing capacity of an environment of variable properties and characteristics.

An additional object is to provide a device for integrating with respect to time the flow of heat between a surface and an environment in contact with the surface.

An additional object is to provide apparatus for integrating over a period of time the rate of heat exchange between a reference chamber having substantially constant properties affecting the rate of heat flow and an environment having variable properties affecting its rate of heat absorption from the surface of the wall of the chamber.

An additional object is to provide a method for accomplishing the objects previously set forth.

Other objects of the invention will be apparent as the description proceeds.

The invention is accomplished by providing a reference chamber in which the temperature, circulation and composition of the medium within the chamber, as well as the radiant energy and other factors affecting the exchange of heat between the medium and the inner surface of the chamber wall are kept as nearly constant as possible. At least one wall, preferably all walls, of the reference chamber consists of a panel of suitable heat-conducting characteristics through which heat is caused to flow from the reference chamber into the environment, e. g., air, whose heat-absorbing characteristics it is desired to integrate over a period of time and which is in direct contact in heat exchange relationship with the outer surface of the panel. The reference chamber is provided with a thermostatically operated electrical heating unit which is heated intermittently, in response to the action of the thermostat, by a current of constant voltage. A clock means is provided outside the chamber connected so that it also operates intermittently in response to the action of the thermostat. The clock, which can be located in any suitable place near to or removed from the reference chamber, thus runs when the heating unit is energized and measures accurately the total time within any given period over which the heating element is energized. The heating unit is connected in series with a voltage regulator to compensate for any variations in the line voltage and thus to insure a constant voltage current for energizing the heating unit. An auxiliary resistance outside the reference chamber is preferably provided and connected in series with the heating unit for adjustment of the actual rate of heat generation by the unit.

The invention can be understood readily by reference to the accompanying drawing wherein, in the interest of clarity, certain features are shown on a somewhat exaggerated scale and wherein:

Figure 1 is an oblique view of certain elements of the apparatus of the invention;

Figure 2 is a vertical section taken along the line II—II of Figure 1;

Figure 3 is a schematic diagram of the electrical system of the apparatus of the invention; and Figure 4 is a schematic view of a clock recording means employed in the apparatus of the invention.

Referring to Figures 1 and 2, there is illustrated, generally, at 11 a reference chamber comprising conveniently a box-like structure having outer side walls 12, a top 13 and a bottom 14 preferably constructed of material having a high radiation factor or emissivity, e. g. 0.75 or above. The chamber, which for some purposes must be mounted out of doors, is generally constructed of weatherproof material and so as to be waterproof as by having the top, bottom and wall members secured to one another in water-tight fashion. The chamber is preferably constructed with the side walls 12 extending below the bottom 14, as at 15, to facilitate draining of rain water cleanly from the sides and with an overhanging edge of the top 13, as at 16, to eliminate any possibility of leakage of rain water into the chamber along the tops of the side walls 12. In certain instances it may be advisable, to avoid accumulation of ice and snow on the top 13 of the chamber, to provide a canopy 17 over the top 13. One convenient form of canopy comprises a sheet of aluminum bent to form a roof-shaped piece and fastened along opposite edges of the cover 13 of the chamber, the other sides of the enclosure thus formed being open. Such a canopy generally projects on all sides beyond the side walls of the chamber.

The reference chamber 11 just described is mounted in any suitable manner where it is exposed as nearly as possible to a representative section of the environment, the heat-absorbing capacity of which it is desired to integrate over a period of time. Thus, when the heat-absorbing capacity of the open atmosphere is to be integrated, the chamber is generally mounted several feet above the ground in the open or above a building where it will not be shaded or subjected to undue heat radiation from nearby objects. In the illustration given in the drawing, mounting of the chamber is accomplished by securing a conventional pipe flange 18 to the bottom 14 of the chamber and screwing a pipe 19 of suitable length into the flange, the pipe being secured at its other end in a suitable location and forming a mast on the top of which the chamber is mounted. A hole 21 is formed in the bottom 14 of the chamber in register with the opening through the flange 18 to provide for entry of electrical leads into the chamber by way of the pipe mast. A suitable pipe T 10 is conveniently inserted between sections of the mast 19 through which the electrical leads can be led from the interior of the mast to any desired location.

The interior of the chamber 11 is lined with a carefully fitted layer of insulation 22 to reduce the rate of heat flow through the chamber wall. A variety of insulating materials can be employed although, for best results, a material having as low a rate of change of heat transfer coefficient with respect to temperature as possible is preferred, as will be apparent later. A good grade of wood fiber insulating board is satisfactory for most purposes. The amount of insulation employed can be varied over reasonably wide limits, although when too great a degree of insulation is employed the rate of heat transfer through the wall may be so slow as to render the instrument somewhat inaccurate because of its lack of sensing frequent small changes in the environment. On the other hand, if not enough insulation is employed, the instrument may be too sensitive to changes in the external environment for best results. The amount of insulation needed for best results also depends to a considerable degree on the nature of the environment. Good results are obtained when the wall in contact with the atmosphere as the environment is constructed to have an absolute rate of heat conduction through it of from about 5 to about 0.05 B. t. u./sq. ft./hr. for each degree Fahrenheit temperature differential through the wall. Generally speaking, a ½ in. layer of wood fiber board having a heat transfer value of about 0.33 B. t. u./sq. ft./inch/° F./hr. has been found suitable as an insulation lining for use in most instances, although the invention is not limited in this respect. Any portions of the walls of the reference chamber which are not in direct contact in heat exchange relationship with the environment should, of course, be insulated as completely and as thoroughly as possible to reduce the rate of heat transfer through such portions to as low a rate as possible.

The insulated reference chamber 11 is equipped with a thermostatically controlled heating unit inside it whereby the temperature of its interior can be maintained at a practically constant value higher than that of the environment surrounding the chamber. In the modification shown, a pair of conventional electrical resistance heaters 23 are mounted within the chamber and shielded with a suitable shield 24 to minimize direct radiation from the heaters to the wall surfaces. A suitable thermostat 25 is mounted, e. g., on a panel 26 on a panel-supporting bracket 27, preferably near the center of the chamber, the heaters and thermostat being connected to a source of E. M. F. as shown in more detail in Figure 3. In most instances the heating unit and thermostat can be connected in series because, as usually constructed and operated, the chamber requires the utilization of only a low amperage current to energize the heating unit. However, it is apparent that in instances where it may be more desirable the heating units can be energized in response to the thermostat through a relay in conventional manner without altering the scope of the invention.

In Figure 3, which illustrates schematically a preferred form of the electrical circuit employed using alternating current, there is shown a source of E. M. F., e. g. 110–120 volts, one pole of which is connected by a conductor 41 to the input pole of a constant voltage regulator 28. The other pole of the source of E. M. F. is connected by a conductor 34 to one pole of a thermostat 25, the other pole of the thermostat being connected to the common pole of the constant voltage regulator by a conductor 31. A variable resistance 29 and the heating units 23 are connected in series by the conductors 37, 36, 32 and 33 between the output pole and the common pole of the constant voltage regulator 28. When the circuit is closed in response to reaction of the thermostat 25, current flows through the constant voltage circuit and energizes the heaters 23. The rate of heat generation by the heaters 23 can be regulated by adjustment of the auxiliary resistance 29 to adapt the apparatus to use under a variety of environmental conditions. The adjustable resistance 29 is, of course, held constant after the instrument has been calibrated.

Because of the fact that the heaters 23 are energized by a constant-voltage current, due to the operation of the voltage regulator 28, their heat output per unit time of energizing is constant and it suffices to measure the total time during which the heaters are energized to gauge accurately the amount of heat generated within the reference chamber. To this end, a suitable clock 38, such as a synchronous motor electric clock or a spring wound magnetically released clock, is provided at any convenient location outside the reference chamber and connected by conductors 35 and 39 between the conductors 31 and 37. The clock 38 is thus activated and runs on constant voltage whenever the heaters 23 are energized. The thermostat 25 and the heating units 23 are located inside the reference chamber 11, as indicated by the dotted square 42 of Figure 3, the constant voltage regulator 28, the variable resistance 29 and the clock 38 being located outside the reference chamber.

Prior to installation, the apparatus is standardized by placing the reference chamber in a suitable location in an environment having a substantially constant temperature lower than the reference temperature to be maintained inside the chamber, as determined by the setting of the thermostat 25, and with other factors, such as humidity, convection currents and the like, which affect the heat-absorbing capacity of the environment, kept as nearly constant as possible. The device is then operated over a period of time and the proportion of the elapsed time over which the test is conducted that the heating element is energized is noted. Since the proportion of the time which the heating element is energized is essentially a linear function of the difference between the reference temperature within the reference chamber and the temperature of the standardized environment, it is thus possible to calculate easily the temperature at which the constant environment would have to be maintained for the heating element to operate continuously during the total elapsed time to maintain the reference temperature constant. This hypothetical environmental temperature is herein referred to as the "zero" temperature of the environment and represents the lowest temperature of an otherwise constant environment in which the apparatus can be operated with satisfaction without readjusting the auxiliary resistance 29 to decrease its resistance value. It is apparent that the apparatus will not function in an environment having a temperature higher than the reference temperature inside the reference chamber as determined by the setting of the thermostat.

With the reference temperature inside the reference chamber and the zero temperature of the environment outside the chamber known, the reference chamber can then be installed in a desired location with the outside of the heat-conducting panel in contact with an environment of variable properties whose heat-absorbing capacity it is desired to integrate over a period of time and the device allowed to operate automatically. Under such conditions, the proportion of the total elapsed time of the observation during which the heating element is energized varies directly as the heat-absorbing capacity of the variable environment when integrated over the total elapsed time varies between that of a constant environment at the reference temperature and that of a constant environment at the zero environmental temperature.

Thus, if the apparatus is operated out of doors on two different occasions for like periods of time, but under differing weather conditions, and it is found on the first occasion that the clock operates fifty percent of the total time and on the second occasion that it operates twenty-five percent of the total time, it can be concluded safely that the integrated heat-absorbing capacity of the atmosphere from the outside wall of the chamber was twice as great on the first occasion as on the second occasion. Furthermore, it can also be concluded safely that on the first occasion the integrated heat-absorbing capacity of the atmosphere was the same as that of an atmosphere of constant properties at a temperature half way between the reference temperature of the reference chamber and the zero environmental temperature.

Inasmuch as the expression of the integrated heat-absorbing capacity of an environment in terms of a proportion of a total elapsed time generally requires further calculation to convert the data to more desirable units, it is convenient to calibrate the clock face and to regulate the rate of heat output by the heaters 23, by adjusting the variable resistance 29, so that a direct reading is observed on the clock in the units desired, e. g. as degree-hours, degree-days or the like. With the apparatus thus calibrated and adjusted, a reading of, for example, nine degree-days on the clock face after a given period of operation can be interpreted safely to mean that, for the period involved, the integrated heat-absorbing capacity of the environment, e. g. the atmosphere, was the same as that of an atmosphere of constant properties either at a temperature one degree below the reference temperature over a period of nine days or at a temperature nine degrees below the reference temperature over a period of one day or, when generalized, of an atmosphere of constant properties at any temperature intermediate the reference temperature and the zero environmental temperature over a period of time such that the product obtained by multiplying the difference between the reference and the intermediate temperatures by the period of time expressed in days is equal to nine.

The following example illustrating the operation and one utility of the apparatus of the invention in determining the frequency necessary for delivering fuel oil to a residence is given by way of illustration, but is not to be construed as limiting, as other ways in which the apparatus can be utilized advantageously will be apparent.

The reference chamber of an apparatus constructed substantially as described herein was mounted in an unsheltered position several feet above the roof of a fuel oil dealer's warehouse, the apparatus being calibrated and adjusted to record the integrated number of degree-days of the atmosphere below a reference temperature of 65° F. maintained inside the reference chamber. The 264 gallon fuel oil tank of a representative residence was filled with oil and the heating unit of the residence was operated normally for a trial period. The amount of oil remaining in the tank was then measured and it was found that 189 gallons of oil had been burned.

The integrating apparatus, which was operated at the fuel dealer's headquarters during the test run on the residence, accumulated a reading of 686 degree-days during the test run. It was, therefore, calculated that for the particular residence concerned the fuel oil consumption under normal operation was 0.27 gallon per degree-day registered by the integrating apparatus and that with the supply tank full of oil the supply on hand would be sufficient to last the householder until the integrating apparatus had accumulated a reading of an additional 980 degree-days.

The supply tank was then filled again and the reading of the integrating apparatus noted. When the reading of the apparatus had increased by a value of 775 degree-days, this being 79 percent of the calculated number of degree-days for which the householder had a supply of fuel on hand, a delivery of oil was made and it was found that it required 209 gallons of oil to fill the tank, as compared with a calculated amount of 208 gallons as being 79 percent of the capacity of the tank. It was, therefore, demonstrated that it was safe to put this particular residence on a delivery schedule such that oil would be delivered after each accumulation of at least approximately 830–840 degree-days by the integrating apparatus, provided delivery could be made promptly when indicated, and to expect to deliver about 225 gallons of oil at each delivery.

This compared with an estimated safe maximum delivery per trip of only about 65 percent of the tank capacity, or about 172 gallons of oil, when relying upon available public weather reports. It was thus apparent that delivery cost could be cut by over 30 percent by employing the integrating apparatus and that a great deal of laborious calculations could be avoided.

Calculation of the oil consumed by the residence per degree-day registered by the integrating apparatus between successive fillings of the tank throughout one entire year, including sporadic heating of the residence during the spring and fall, gave the following values: 0.27, 0.27, 0.25, 0.25, 0.29, 0.28, 0.27 and 0.28.

The reference chamber of the apparatus used in the illustration just given was constructed from 20 gauge metal with a dull surface. The chamber was 6 inches square and 8 inches high in outside dimensions and the top, bottom and side walls were welded to form airtight joints. The chamber was painted brown on the outside and was lined completely with tightly fitted pieces of wood fiber insulating board one-half inch thick. The chamber was equipped with an overhead weather shield, similar in shape to that shown at 17 in Figure 2 of the drawing, constructed of 20 gauge aluminum painted brown. The chamber was mounted on a three-fourths inch pipe mast similar to that illustrated in the drawing. Electric leads were conducted several hundred feet to an office building where the voltage regulator, the variable resistance and the clock were located. Two 100-watt electric heaters were mounted inside the reference chamber about three-fourths inch from either side wall of the chamber and elevated about three-fourths inch from the bottom wall of the chamber. The shield under the heaters consisted of a flat cadmium plated steel sheet with turned up edges about 1 inch high along two opposite sides of the sheet, the turned up edges being spaced about three-eighths inch from the respective side walls and extending parallel with the longitudinal axis of the electric heaters. The hole in the bottom of the chamber extending through the outer metal sheet, the insulating board and the shield was one-half inch in diameter.

With the apparatus constructed in the particular manner described, about 20 watts of electrical energy was used to energize the heaters and to operate the clock.

Although a method has been described previously for standardizing the apparatus of the invention to determine the zero temperature of an atmospheric environment in which it can be operated, it should be pointed out that under normal manufacturing conditions the instruments can be manufactured on a mass basis with sufficient identity of one instrument with another to make the standardization of each instrument unnecessary. However, each instrument can be restandardized from time to time in the manner described if this appears necessary or desirable.

Although the utility of the apparatus of the invention has been described with particular reference to its use by a fuel oil dealer in regulating the frequency of delivery of oil to his customers, the apparatus has utility in other ways as well. Thus, by adjusting the insulation of the walls of the reference chamber so that heat will be dissipated through the walls from the inside of the chamber fairly rapidly, and the instrument thus made to sense the temperature of the environment with corresponding rapidity, the apparatus can be employed to indicate the temperature of the environment. The apparatus can be constructed for use in this manner so that only a few minutes are required for each temperature observation. During such short periods of time the heat-absorbing characteristics of even the atmosphere as an environment can be considered as substantially constant, particularly if the reference chamber is sheltered from wind and precipitation, and an observation under such conditions will give the actual temperature of the atmosphere. Inasmuch as the clock means can be located at any suitable distance from the reference chamber, the instrument is thus ideally suited for remote observation of weather conditions. It is entirely feasible to provide automatic means, if desired, to turn the instrument on or off at predetermined intervals to make periodic observations, each integrated over a suitable short period of time. Data obtained by operation of the instrument can be transmitted and received automatically by radio when desired and the apparatus thus employed in especially remote locations, employing storage batteries or wind generators as a source of power. Automatic recording means can be employed in conjunction with the clock means when desired.

The apparatus also finds utility in the measurement of the heat-conducting characteristics of insulating materials of different sorts. For use in this manner the reference chamber can be constructed with one wall, conveniently a side wall panel, removable and replaceable by a wall panel of the same dimensions fashioned from the insulating material whose heat-conducting characteristics it is desired to determine. The other walls, including the top and bottom, of the reference chamber are insulated heavily to reduce to an absolute minimum the rate of heat flow through them. The reference chamber is then placed in an environment whose temperature and other properties affecting its heat absorption are held as nearly constant as possible. The temperature of the environment is generally maintained several degrees lower than the reference temperature inside the reference chamber.

With the replaceable panel consisting of a substance of known heat-conducting capacity, the apparatus is operated over a suitably long period of time and the total length of time during the period over which the heating units are energized is noted. The replaceable panel is then replaced with a panel constructed from the substance whose heat-conducting capacity is to be measured and the apparatus again operated under identical conditions for the same period of time and the total length of time during the period over which the heater is energized is again noted. The heat-conducting capacity of the known and unknown panels will be in the same proportion to one another as the total lengths of time over which the heating units are energized during the respective test periods.

An alternate method of utilizing the apparatus for determining the heat-conducting characteristics of a product which avoids the necessity of maintaining the heat-absorbing characteristics of the environment constant involves the use of duplicate sets of apparatus constructed in the manner described and calibrated carefully to give identical data when operated under identical conditions. In one apparatus the insulation of the reference chamber is effected using material of known heat-conducting characteristics. The reference chamber of the other instrument is constructed so that it is insulated in identical manner as the first apparatus but using the material whose heat-conducting characteristics it is desired to determine. The two sets of apparatus can then be mounted relatively near one another in the same environment, e. g. out of doors, and each instrument allowed to operate for the same length of time without regard to variations in the properties of the environment which affect its heat-absorbing capacity since both instruments will be affected in the same way by such variations. At the end of the period the total time over which the heating unit in each reference chamber has been energized is noted. The heat-conducting characteristics of the two insulating materials will then be in direct proportion to the lengths of time over which the respective heating units were energized.

I claim:

1. In apparatus for integrating over a period of time the heat-absorbing capacity of an environment, the combination including: a reference chamber having a heat conducting wall adapted to have its exterior surface in heat-exchange relationship with an environment the heat-absorbing capacity of which it is desired to integrate over a period of time; thermostatically controlled electric heating means within the reference chamber adapted to maintain the temperature therein substantially constant at a predetermined value over the period of integration; means outside the reference chamber adapted to supply a constant voltage electric current for energizing the heating means; and electrically operated clock means outside the reference chamber controlled by the same thermostat which controls the heating means whereby the total time of energizing of the heating means during the period of integration is registered by the clock means.

2. Apparatus as claimed in claim 1 adapted to integrate the heat-absorbing capacity of the outdoor atmosphere wherein the heat-conducting wall is insulated so as to permit the passage through it of from about 5.0 to about 0.05 B. t. u. per sq. ft. per hour per degree Fahrenheit temperature differential through the wall.

3. Apparatus as claimed in claim 1 including an adjustable variable resistance outside the reference chamber connected in series with the thermostatically controlled heating means whereby the voltage of the electric current utilized for energizing the electric heating means can be adjusted to a predetermined constant value.

4. Apparatus as claimed in claim 1 wherein the reference chamber is constructed with a weatherproof wall having a surface with a high radiation factor and lined completely with an insulating material, the coefficient of heat conduction of which is substantially unaffected by temperature.

5. In a method for integrating over a period of time the heat-absorbing capacity of an environment, the steps which include: providing a reference chamber with a heat-conducting wall, the outer surface of which is in heat-exchange relationship with an environment the heat-absorbing capacity of which it is desired to integrate over a period of time, the temperature inside the chamber being maintained during the integrating period at a substantially constant reference temperature higher than the temperature of the environment by thermostatically controlled electrical heating means energized by constant-voltage electric current; measuring the total time of energizing of the heating means required during the integrating period to maintain the reference temperature substantially constant; and expressing the integrated heat-absorbing capacity of the environment over the integration period in terms of the temperature of a constant environment lower than that of the reference temperature by a value which is the same proportion of the difference between the reference temperature and the temperature of a constant environment requiring continuous energizing of the heating means during the entire integrating period as the actual time of energizing of the heating means is of the entire integrating period.

6. The method of claim 5 wherein the relationship between the period of integration and the rate of change in the properties of the environment affecting its heat-absorbing capacity is maintained such that the heat-absorbing capacity of the environment is susbtantially constant over the entire integrating period whereby the integrated heat-absorbing capacity of the environment is expressed in terms of the temperature of the actual environment.

References Cited in the file of this patent

UNITED STATES PATENTS

| 1,865,332 | Osterheld | June 28, 1932 |
| 2,065,835 | Taylor | Dec. 29, 1936 |
| 2,065,841 | Uehling | Dec. 29, 1936 |
| 2,065,844 | Wattles, 3rd. | Dec. 29, 1936 |
| 2,157,910 | McCormick | May 9, 1939 |
| 2,612,026 | Hansen et al. | Sept. 30, 1952 |

OTHER REFERENCES

Yost: Heating and Ventilating; Dec. 1934; vol. 31; No. 12; page 52.